United States Patent [19]

Sato

[11] Patent Number: 4,738,409

[45] Date of Patent: Apr. 19, 1988

[54] FISHING REEL

[75] Inventor: Jun Sato, Sakai, Japan

[73] Assignee: Shimano Industrial Company Limited, Osaka, Japan

[21] Appl. No.: 942,917

[22] Filed: Dec. 18, 1986

Related U.S. Application Data

[63] Continuation of Ser. No. 788,502, Oct. 18, 1985, abandoned, which is a continuation of Ser. No. 586,277, Mar. 5, 1984, abandoned.

[30] Foreign Application Priority Data

Mar. 7, 1983 [JP] Japan .......................... 58-32578[U]
Mar. 7, 1983 [JP] Japan .......................... 58-32579[U]

[51] Int. Cl.⁴ .............................................. A01K 89/02
[52] U.S. Cl. .................................................. 242/212
[58] Field of Search .............................. 242/211–214, 242/216–221

[56] References Cited

U.S. PATENT DOCUMENTS

| | | | |
|---|---|---|---|
| 625,166 | 5/1899 | Hastings | 242/211 |
| 781,776 | 2/1905 | Leaver | 242/211 |
| 842,551 | 1/1907 | Hunter | 242/216 |
| 2,760,357 | 8/1956 | Burns | 242/219 |
| 4,142,694 | 3/1979 | Ranken, Jr. | 242/211 |
| 4,482,105 | 11/1984 | Noda | 242/212 |

Primary Examiner—John M. Jillions
Attorney, Agent, or Firm—Stevens, Davis, Miller & Mosher

[57] ABSTRACT

A fishing reel is provided with a reel body having a pair of side frames, a spool supported between the side frames, a drive mechanism for driving the spool, a clutch mechanism for allowing the spool to freely rotate with respect to the drive mechanism, and a clutch operating mechanism having a clutch lever. A lever operating member is provided having an operating portion for operating the clutch lever and is mounted with one of the side frames, the lever operating member being supported to the side frame in such manner that an angler, when operating the operating portion to disconnect the clutch mechanism and at the terminus of this operation, may put the tip of his finger operating the operating portion in close proximity to the outer portion of the spool, thereby making it possible to stop free rotation of the spool, by use of the aforesaid finger, in continuation of operation of the operating portion.

3 Claims, 3 Drawing Sheets

FISHING REEL

This application is a continuation of application Ser. No. 788,502 filed Oct. 18, 1985, now abandoned, which is a continuation of application Ser. No. 586,277, filed Mar. 5, 1984, now abandoned.

FIELD OF THE INVENTION

This invention relates to a fishing reel, and more particularly to a fishing reel which has a spool supported by a spool shaft journalled to a pair of side frames at the reel body, the spool being driven by a drive mechanism and being freely rotatable with respect thereto upon operation of a clutch mechanism which is operated by a clutch operating mechanism.

BACKGROUND OF THE INVENTION

Generally, the type of fishing reel just described is well-known as a double bearing reel, in which the clutch operating mechanism is provided with a clutch lever supported slidably to the reel body. The clutch lever has at its utmost end an operating portion projecting from the outer surface of the reel body so that the operating portion, when pushed by an angler, disconnects the clutch mechanism to make the spool freely rotatable for casting.

The angler, when intending to cast, at first pushes the operating portion by his finger to disconnect the clutch mechanism and press-contacts the finger onto the outer portion of the spool, i.e., the outermost layer of a fishing line wound on the spool to stop its rotation, and then swings a fishing rod for casting.

The reason for the above is that the spool, unless its rotation is stopped, will continue its free rotation due to its weight, resulting in that a fishing rig, which is kept intentionally at the top of the rod in preparation for casting, falls down on the ground before the rig reaches a desired position in the cast.

The conventional double-bearing reel, however, has the operating portion of the clutch lever positioned apart from the spool so that the angler, when intending to stop the free rotation of the spool by use of his finger, after pushing the operating portion, cannot in a serial motion stop the free rotation of the spool in continuation of the operation of the operating portion. Thus, there is a time difference between the push of the operating portion and the stopping of the spool. As a result, he cannot perform a desired casting due to a shift of the fishing rig.

SUMMARY OF THE INVENTION

In the light of the above problem, this invention has been designed. An object of the invention is to provide a fishing reel which is capable of stopping the free rotation of the spool almost simultaneously with and in continuation of the operation of the operating portion at the clutch lever.

In the invention a lever operating member for operating the clutch lever is formed separately therefrom, and is adapted to a side frame supporting the clutch lever in such manner that an operating portion at the lever operating member, when operated for disconnection of the clutch mechanism, can approach the outermost layer of the fishing line wound onto the spool and be positioned in close proximity to the outermost layer of the fishing line.

Therefore, upon casting, the angler can use his same finger to stop the free rotation of the spool almost simultaneously with operating the operating portion to disconnect the clutch mechanism, thereby keeping the fishing rig always in the most suitable position for his desired casting.

A means for shifting the operating portion, when operated, in proximity to the outermost layer of the fishing line wound onto the spool can be so constructed that the lever operating member is pivotally supported in such manner that, for example, the center of swinging of the lever operating member extends perpendicularly to a plane including the center of rotation of the spool. Alternatively, a pivot shaft pivotally supporting the lever operating member is adapted to extend parallel to the center of rotation of the spool and to be slanted as that one end portion of the pivot shaft at the spool side is made nearer the center of rotation of the spool than the other end portion.

The outermost layer of the wound fishing line serves as the criterion for setting the operating portion and also includes the outer periphery of each flange of the spool.

These and other objects of the invention will be seen by reference to the description, taken in connection with the accompanying drawings.

BRIEF DESCRIPTION OF THE DRAWINGS

FIG. 4 is a sectional plan view thereof, FIG. 5 is a sectional side view thereof, and FIG. 6 is a perspective view of a lever operating member only.

BRIEF DESCRIPTION OF THE INVENTION

Figure 1:
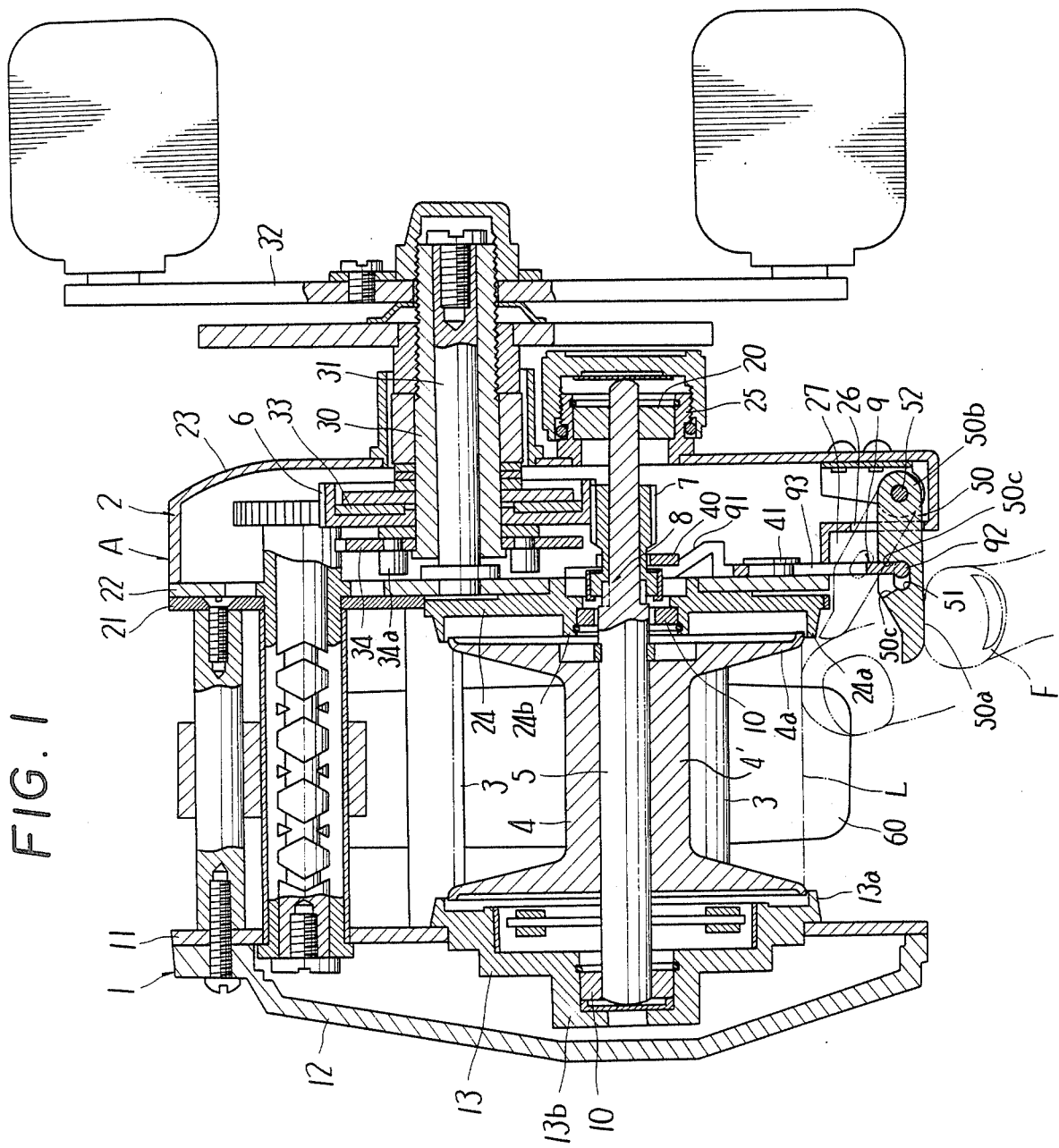
FIG. 1 is a sectional plan view of an embodiment of a fishing reel of the invention.
Figure 2:
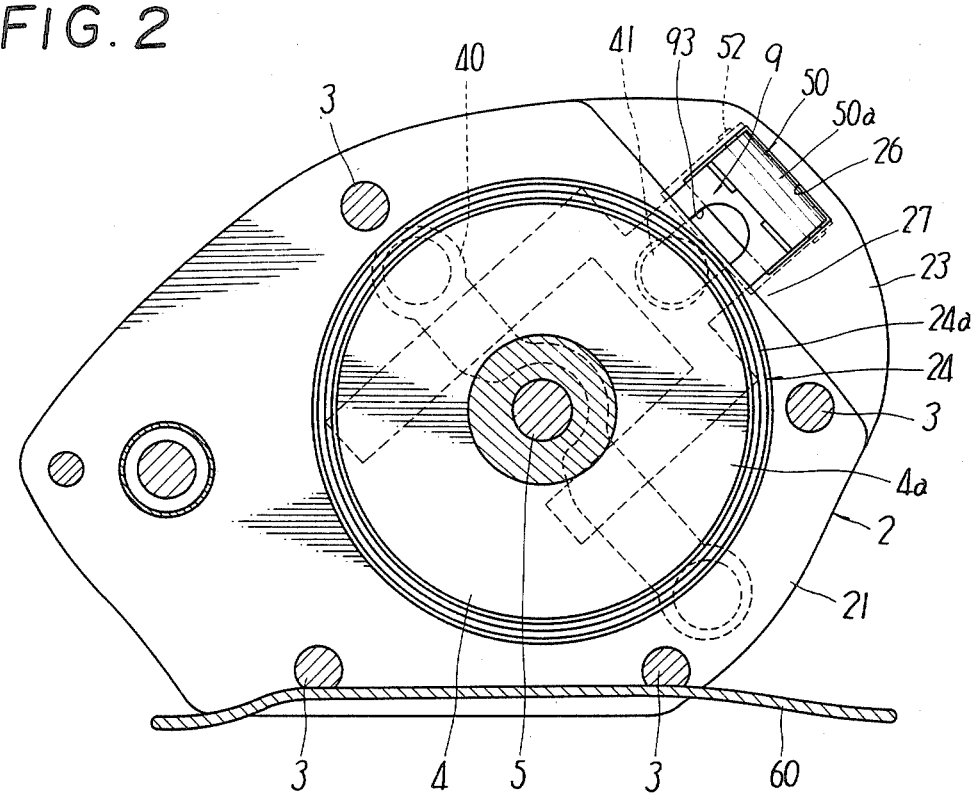
FIG. 2 is a sectional side view thereof.

A fishing reel shown in FIGS. 1 and 2 has a reel body A which comprises a first side frame 1 including a left-hand side-plate 11 and a cup shaped cover 12 attached at the outside thereof; a second side frame 2 including a right-hand side-plate 21, a doubling plate 22 attached at the outside thereof, and a cup shaped cover 23 attached at the outside thereof; and a plurality of connecting rods 3 connecting the first and second side frames 1, 2. A spool shaft 5 having a spool 4 with a trunk portion 4' is journalled between the first and second side frames 1, 2, and a handle shaft 30 having a master gear 6 is rotatably supported, through a support shaft 31, between the doubling plate 22 and the cover 23 at the second side frame. The handle shaft 30 projects outwardly at one axial end from the cover 23 so that a handle 32 is fixed to the extension of handle shaft 30. The spool shaft 5 extends at one coaxial end to enter into the cover 23 and carries a pinion 7 engageable with the master gear 6 on the extension of spool shaft 5 in relation of being rotatable and axially slidable. Between the pinion 7 and the spool shaft 5 is provided a clutch mechanism 8, which engages or disengages in response to operation of a clutch operating mechanism including a clutch lever 9, so that when the clutch mechanism 8 is engaged, the rotary force is transmitted from the handle 32, and in turn, the handle shaft 30 to the spool shaft 5 through the master gear 6, pinion 7 and clutch mechanism 8 to thereby rotate the spool 4, and when the clutch mechanism 8 is disengaged, the spool 4 is allowed to freely rotate.

The side plates 11, 21 at the first and second side frames 1, 2 and the cover 23 have at their centers bearing housings 13, 24, and 25. The bearing housings 13, 24 at the side plates 11, 21 are provided at the outer peripheries with larger diameter cylindrical portions 13a, 24a which each are made slightly larger in diameter than an outer diameter of each flange of the spool 4. The housings 13, 24 have at the central portions smaller diameter cylindrical bearing portions 13b, 24b respectively. Each of housings 13, 24, 25 encases therein bearings 10, 10, and 20 respectively.

Onto the extension of handle shaft 30 entering into the cover 23 is rotatably and freely fitted the master gear 6 and not-rotatably fitted a friction plate 33 and an anti-reverse-rotation plate 34 having a plurality of projections 34a, so that the rotary force is transmitted from the handle shaft 30 to the master gear 6 through the friction plate 33.

The clutch mechanism 8 is so constructed that the spool shaft 5 is provided at its intermediate portion with flat faces, and the pinion 7 is provided with a cylindrical portion of a not-round inner surface and engageable with the flat faces of the spool shaft, so that the cylindrical portion of the pinion 7 is disengaged from the flat faces portion of the spool shaft 5 by means of operation of the clutch lever 9, thereby allowing the spool shaft 5 together with the spool 4 fixed thereto to rotate freely.

Furthermore, the clutch operating mechanism comprises the clutch lever 9 and a clutch yoke 40 which holds the pinion 7 to always bias the clutch mechanism 8 in the direction of its engagement. The clutch lever 9 is bifurcated in a fork-like shape and has a pushing portion 91 biasing the clutch yoke 40.

The clutch lever 9 having an elongate slot 93 is supported to the doubling plate 22 movably in reciprocation by means of the elongate slot 93 and a pin 41 fixed parallel to the spool shaft 5, the clutch lever being biased in the direction of the backward movement by a return spring (not shown), so that the clutch lever 9 is pushed to move the clutch yoke 40 axially of the spool shaft, thereby moving the pinion 7 to disconnect the clutch mechanism 8.

Meanwhile, the handle 32 can be rotated to allow the protuberances 34a at the anti-reverse-rotation plate 34 to hit a contact member (not shown) provided at the utmost end of clutch lever 9 to thereby return the clutch lever 9 to its original position by the aid of the return spring and axially move the pinion 7 by the biasing force of clutch yoke 40, thus engaging the clutch mechanism.

In addition, the clutch lever 9 is swingable around the pin 41 fixed to the doubling plate 22 and has at the utmost end an engaging portion which engages with a cut-out stepped portion provided at the doubling plate 22, thereby holding the clutch lever 9 at the position where the forward movement thereof is terminated.

In the abovesaid construction, the handle shaft 30, handle 32, master gear 6 and friction plate 33 constitute a drive mechanism for the spool 4.

The present invention provides a lever operating member 50 separate from the clutch lever 9 which has an operating portion 50a and serves for operating the clutch lever 9. The lever operating member 50 is supported to the second side frame 2 in such a manner that when the lever operating member 50 is operated in a direction of disconnecting the clutch mechanism 8 to come to a terminus of the operation shown by a phantom line in FIG. 1, the operating portion 50a can be positioned in close proximity to the outermost layer L of the fishing line wound onto the spool 4 or outer peripheral portion of the flange 4a of the spool 4.

Figure 3:
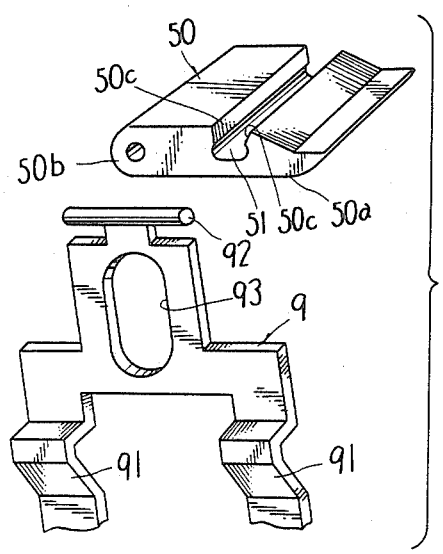
FIG. 3 is a perspective view of a part of clutch lever and a lever operating member in disassembly.

The lever operating member 50 formed in an elongate plate-like shape has, as shown in FIGS. 1–3, at one end a root portion 50b, at the other end the operating portion 50a, and at the intermediate portion a groove 51 elongated in the lengthwise direction (from the root 50b toward the operating portion 50a) of the lever operating member 50 and extending along the whole widthwise length thereof.

The clutch lever 9 is adapted to project outwardly of the second side frame 2 to have at this outward projecting portion an integrally formed fitting shaft 92 which extends perpendicularly to the movement direction of the clutch lever 9 and along the width of the lever operating member 50. The fitting shaft 92 is fitted into the elongate groove 51 to retain swingably the lever operating member 50 at its intermediate portion to the clutch lever 9, and the operating portion 50a of lever operating member 50 is arranged outside of the side plate 21 of second side frame 2 to extend toward the spool 4. The root portion 50b is fit into the second side frame 2 through a window bore 26 provided thereat to be swingably supported within the cover 23 by means of a pivot shaft 52 having an axis perpendicular to a plane including a center of rotation of the spool 4, so that the operating portion 50a extending from the second side frame, when operated upon operation of the lever operating member 50 in a direction of disconnecting the clutch mechanism 8, approaches the outer peripheral surface of the larger diameter cylindrical portion 24a of bearing housing 24, in other words, the outer peripheral portion of the flange 4a of spool 4.

The lever operating member 50 is provided with a pair of restriction faces 50c, 50c in continuation to the elongate groove 51 for restricting the swinging extent of the lever operating member 50 with respect to the clutch lever 9.

The second side frame 2 is so constructed as shown in FIGS. 1 and 2 that the right-hand side-plate 21 and doubling plate 22 are cut at their edge portions opposite to the lever operating member 50 to be substantially level with the outer peripheral surface of bearing housing 24, and cup shaped cover 23 is deformed inward at a portion opposite to the lever operating member 50, particularly at the edge portion at the doubling plate 22 side. The deformed edge portion at the cover 23 is adapted to extend toward the edge of the cut-out portion of doubling plate 22, thereby providing a recessed portion 27 at the portion of the second side frame 2 opposite to the lever operating member 50 provided thereat acting at the recessed portion, so that the operating portion 50a of lever operating member 50 can be adapted to be shifted in closer proximity to the outer peripheral portion of flange 4a of spool 4.

The second side frame 2 may be so designed without providing the recessed portion 27 with the cover 23, side-plate 21 and doubling plate 22 being modified or cut-out at the portions corresponding to the recessed portion 27, in turn, opposite to the lever operating member 50 to be substantially level at the modified portion with the outer periphery of bearing housing 24.

The fishing reel constructed as abovesaid is mounted to a fishing rod by means of a mounting leg 60 provided between the first and second side frames 1, 2. When an angler performs casting while grasping the fishing rod, he first rotates the handle 32 to wind up the fishing line to thereby place a fishing rig mounted at the utmost end thereof near the tip of the fishing rod. Then, the angler stretches his thumb F of the hand grasping the fishing rod to push the operating portion 50a of lever operating member 50 to thereby disconnect the clutch mechanism 8, and then stops free rotation of the spool 4, and thereafter swings the fishing rod to throw the fishing rig.

In this case, when the operating portion 50a is pushed to disconnect the clutch mechanism 8, the lever operating member 50 is first swung clockwise (in FIG. 1) around the pivot shaft 52 as shown by the phantom line in the drawing and comes to the terminus of the swinging to be inclined toward the outer peripheral portion of flange 4a of spool 4, so that the operating portion 50a is positioned in proximity to the outer surface of the spool 4, and in turn, the outermost layer L portion of the fishing line wound onto the spool. Therefore, the tip of the angler's thumb F operating the operating portion 50a is positioned near and substantially contacts with the outer layer L portion of the line. Additionally, the lever operating member 50 is operated to be inclined so that the thumb F pushing the operating portion 50a can reasonably naturally slide at the operating portion 50a downwardly slantwise along the inclination of the lever operating member 50 to thereby be readily movable sidewise. In other words, the tip of thumb F pushing the operating portion 50a can be reasonably naturally removed therefrom due to the potency from the pushing operation to immediately thereafter contact with the outermost layer L of the line, whereby the free rotation of the spool 4 can be stopped almost simultaneously with the disconnection of the clutch mechanism 8.

As a result, the free rotation of spool 4 can be immediately inhibitted to restrict to a minimum a fall down of the fishing rig due to its weight, resulting in a desired casting.

In the embodiment shown in FIGS. 1 and 2, the lever operating member 50 is swingably supported to the second side frame 2 through the pivot shaft 52 but alternatively it may be supported to the side frame without the pivot shaft. Additionally, the lever operating member 50 may be formed integrally with the cover 23 by means of a thin hinge portion and the like.

The lever operating member 50 is, as shown, swung radially of the spool 4, and may alternatively be swung in a peripheral direction thereof.

Alternatively, the lever operating member may be supported movably in the same direction as that of movement of the clutch lever 9. In this case, means for supporting the lever operating member is not specifically defined.

When the lever operating member 50 is swingably supported, it is preferrable to provide, as shown in FIGS. 1 and 2, an elongate groove 51 at the intermediate portion of the operating member 50 so as to retain the same to the clutch lever 9. Alternatively, the operating member 50 may be merely contacted with the clutch lever but not retained thereto, and the contact may be maintained by use of a spring which biases the lever operating member 50 unidirectionally. In other words, many modifications ca be made, provided that the clutch lever 9 can be actuated by operation of the lever operating member 50.

When the lever operating member is supported by use of a pivot shaft, the following feature can be applied. In detail. a lever operating member 50 is, as shown in FIGS. 4 through 6, pivoted rotatably through a pivot shaft 520, and the pivot shaft 520 is adapted to extend substantially parallel to the center of rotation of spool 4 and to be slanted in a direction wherein one end portion of the pivot shaft 520 at the spool 4 side is made nearer the center of rotation of spool 4 than the other end portion, so that an operating portion 500a of the lever operating member 500 which rotates around the pivot shaft 520, when the lever operating member 500 is operated in a direction of disconnecting the clutch mechanism 8, can approach to be positioned in close proximity to the outermost layer L of the fishing line wound onto the spool 4 or outer peripheral portion of flange 4a of the spool 4.

Figure 6:
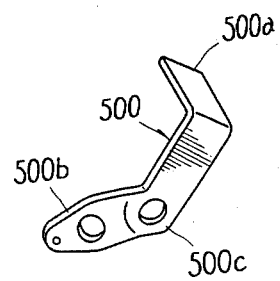
FIGS. 4 through 6 show a modified embodiment.
Figure 4:
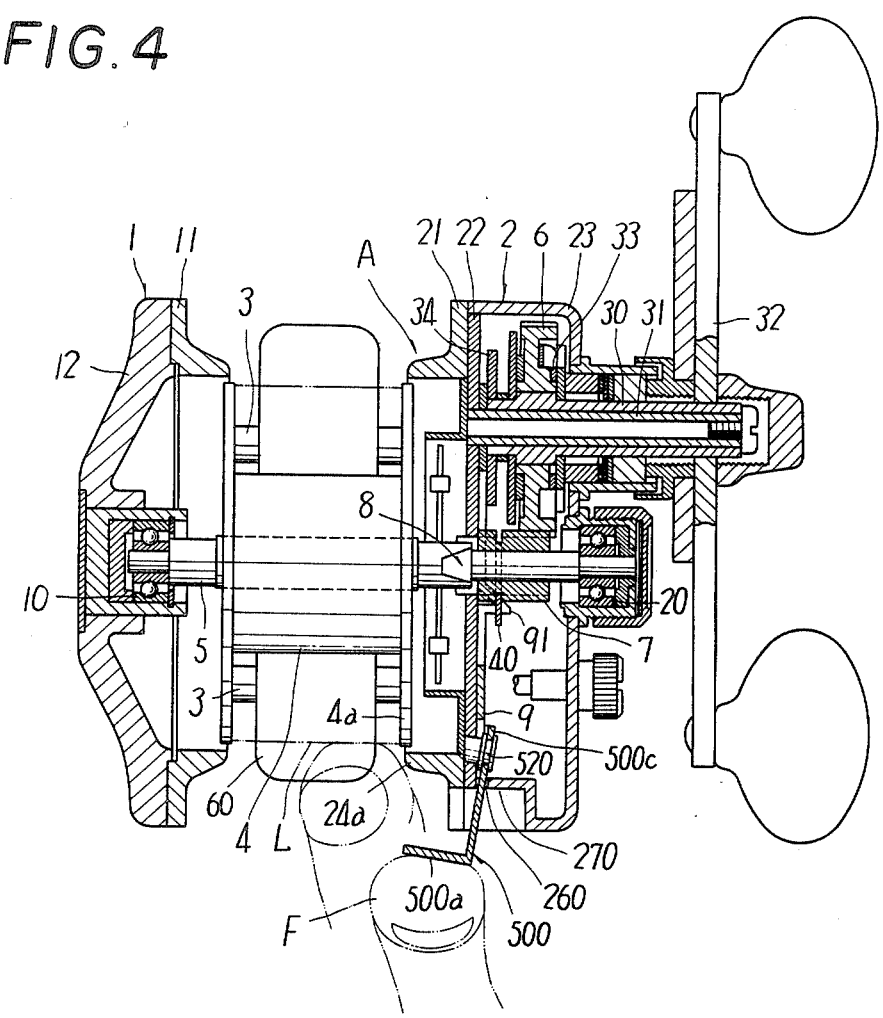
Figure 5:
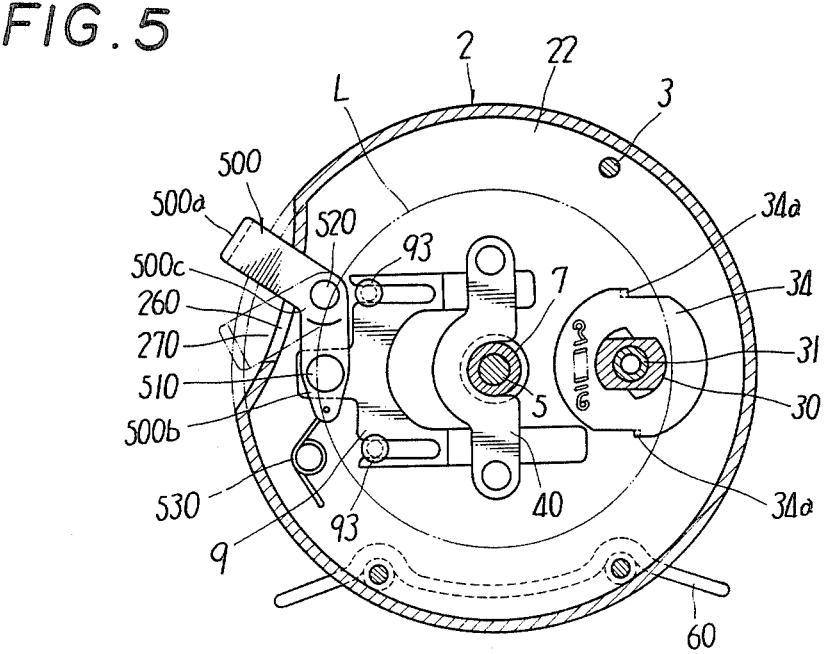

The lever operating member 500 shown in FIGS. 4-6, is formed in a bell crank shape to have at one end the operating portion 500a and at the other end an association portion 500b, the operating portion 500a being bent to be substantially parallel to the pivot shaft 520. The lever operating member 500 is arranged at a recessed portion 270 formed at the second side frame 2 so as to project or extend the operating portion 500a toward the spool 4 side. The association portion 500b and the intermediate bent portion 500c between the operating portion 500a and the association portion are inserted into the second side frame 2 through a window bore 260 provided at the recessed portion 270, and the intermediate bent portion 500c is pivoted to the doubling plate 22 by means of the pivot shaft 520. The association portion 500b is, as shown in FIG. 5, pivoted to the clutch lever 9 by means of a shaft 510, and a torsion spring 530 is interposed between the utmost end of the association portion 500b and the doubling plate 22, so that the lever operating member 500 is halted, by the aid of the torsion spring 530, at one of each operational positions of the lever operating member for engaging and disconnecting of the clutch mechanism.

Reference numerals 93, 93 designate a guide pin for slidably supporting the clutch lever 9 to the doubling plate 22.

The pivot shaft 520 may alternatively be formed integrally, for example, with the doubling plate 22 of the reel body A.

In the embodiments shown in FIGS. 1, 2 and 4, 5, the lever operating member is supported to the second side frame 2, but it may alternatively be supported to the first side frame 1 or to the connecting rod 3 connecting the firs and second side frames.

As seen from the above, the invention provides a lever operating member for operating the clutch lever which is formed separately therefrom and is uniquely designed to be supported to the side frame to which the clutch lever is arranged, so that the free rotation of the spool can be inhibitted almost simultaneously with operation of the operating portion of the lever operating member by means of the angler's finger operating the same, thereby keeping the fishing rig always in the most suitable position for his desired casting.

Although several embodiments have been described, they are exemplary of the invention and not to be construed as limitting, the invention being defined solely by the appended claims.

What is claimed is:

1. A fishing reel comprising:
   a reel body having a pair of side frames,
   a spool for winding thereon a fishing line, said spool having a trunk portion, side flanges and a spool shaft disposed between said side frames at said reel body, a drive mechanism for driving said spool, a clutch mechanism for coupling said drive mechanism to drive said spool when connected and for allowing said spool to freely rotate with respect to said drive mechanism when disconnected, and a clutch operating mechanism having a clutch lever and adapted to operate said clutch mechanism, said clutch operating mechanism including a lever operating member having an operating portion and adapted to operate said clutch lever which is mounted to one of said side frames, said lever operating member being elongated and pivotably supported at one lengthwise end by a pivot shaft to said one of said side frames, said pivot shaft being (i) spaced radially outwardly from radially outer peripheries of said side flanges of said spool, (ii) oriented substantially perpendicularly to a plane which contains a center axis of said spool shaft of said spool and which intersects said pivot shaft and (iii) aligned on a non-intersecting line relative to said center axis of said spool shaft, another lengthwise end of said lever operating member comprising said operating portion, said clutch lever being positioned between said lever operating member and said center axis of said spsool shaft, said operating portion being positioned adjacent to said clutch lever to enable said operating portion to engage said clutch lever to disconnect said clutch mechanism; when said lever operating member is operated by an angler's finger to move the clutch lever to disconnect the clutch mechanism, the lever operating member becomes inclined to allow said operating portion to move toward said spool shaft and closer to an outermost layer portion of a fishing line wound onto said spool so that when said operation portion is pushed by said angler's finger toward said spool shaft, said finger approaches said spool making it possible to touch an outermsot layer portion of said line in continuation of the pushing of said operating portion by said angler's finger, and when said lever operating member is in a non-operated position in which the clutch lever is not disconnecting the clutch mechanism, said operating portion is positioned axially of said spool shaft such that it is non-intersecting relative to any plane which cuts through and is perpendicular to a longitudinal axis of said trunk portion of said spool.

2. A fishing reel according to claim 1, wherein said lever operating member is pivotably connected at a pivot portion thereof to said pivot shaft which is supported to said side frame at which said clutch lever is mounted, the center axis of said pivot shaft of said lever operating member extends perpendicularly to a plane including the center axis of said spool shaft, and when said lever operating member is pivoted relative to said side frame to operate said clutch lever, said operating portion of said lever operating member is moved to be nearer the central portion of said spool in the lengthwise direction thereof than is said pivot portion of said lever operating member, such that said operating portion approaches said outermost layer portion of said fishing line wound onto said spool.

3. A fishing reel according to claim 1, wherein said pivot shaft is oriented vertically relative to said reel body.

* * * * *